(12) United States Patent  (10) Patent No.: US 7,694,905 B2
Fornage  (45) Date of Patent: Apr. 13, 2010

(54) MILL FOR SEASONINGS, IN PARTICULAR, FOR MOIST GUÉRANDE SALT

(75) Inventor: Jean-Claude Fornage, Besancon (FR)

(73) Assignee: Poivrières Salières Production PSP, Bençon (FR)

( * ) Notice: Subject to any disclaimer, the term of this patent is extended or adjusted under 35 U.S.C. 154(b) by 0 days.

(21) Appl. No.: 10/586,215

(22) PCT Filed: Nov. 24, 2004

(86) PCT No.: PCT/FR2004/002992

§ 371 (c)(1),
(2), (4) Date: Jul. 17, 2006

(87) PCT Pub. No.: WO2005/079645

PCT Pub. Date: Sep. 1, 2005

(65) Prior Publication Data

US 2007/0215731 A1    Sep. 20, 2007

(30) Foreign Application Priority Data

Jan. 22, 2004   (FR)   ................... 04 00612

(51) Int. Cl.
A47J 43/00 (2006.01)
B02C 15/00 (2006.01)
(52) U.S. Cl. ................. 241/152.2; 241/169.1
(58) Field of Classification Search .............. 241/169.1, 241/168, 152.2
See application file for complete search history.

(56) References Cited

U.S. PATENT DOCUMENTS

| 1,327,385 A | 1/1920 | Hammer |
| 2,858,081 A * | 10/1958 | Sinkinson ................ 241/169.1 |
| 3,124,313 A | 3/1964 | Kraus |
| 3,168,256 A | 2/1965 | Bounds et al. |
| 4,343,437 A | 8/1982 | Czelen |
| 4,685,627 A | 8/1987 | Lee |
| 4,993,584 A | 2/1991 | Macario |
| 5,651,506 A | 7/1997 | Hockey |
| 5,785,264 A | 7/1998 | Yang |
| 6,491,244 B2 * | 12/2002 | Pedersen ................. 241/169.1 |
| 6,616,075 B1 * | 9/2003 | Millerd ........................ 241/168 |
| 7,048,216 B2 | 5/2006 | Ng |
| 2002/0038832 A1 * | 4/2002 | Chen ........................ 241/169.1 |
| 2002/0117566 A1 | 8/2002 | Cheng |
| 2002/0117567 A1 | 8/2002 | Lee et al. |
| 2002/0145065 A1 | 10/2002 | McCowin |
| 2004/0124294 A1 * | 7/2004 | Ng ........................... 241/169.1 |
| 2004/0164193 A1 | 8/2004 | Yang |
| 2008/0315022 A1 | 12/2008 | Wilson et al. |

FOREIGN PATENT DOCUMENTS

| BE | 469899 | 6/1947 |
| CH | 351726 | 1/1961 |
| DE | 2922656 | 12/1980 |
| DE | 8531554 | 12/1985 |

(Continued)

*Primary Examiner*—Faye Francis
(74) *Attorney, Agent, or Firm*—Gary M. Cohen

(57) ABSTRACT

A mill for grinding seasonings, particularly moist salts such as Guérande salt, includes a body and a cap covering the body. A drive shaft is received within the body and has a device for breaking up the seasoning.

15 Claims, 2 Drawing Sheets

FOREIGN PATENT DOCUMENTS

| | | |
|---|---|---|
| DE | 3632688 | 2/1993 |
| DE | 19514794 | 10/1996 |
| DE | 20000353 | 5/2000 |
| EP | 0281714 | 9/1988 |
| FR | 2159828 | 6/1973 |
| FR | 2852505 | 9/2004 |
| FR | 2857841 | 1/2005 |
| FR | 2857842 | 1/2005 |
| FR | 2873559 | 2/2006 |
| GB | 1429310 | 3/1976 |
| WO | WO 0028870 | 5/2000 |

\* cited by examiner

MILL FOR SEASONINGS, IN PARTICULAR, FOR MOIST GUÉRANDE SALT

BACKGROUND OF THE INVENTION

The present invention relates to a mill for seasonings, and in particular, to a mill for use with moist salt such as Guérande salt.

The disadvantage of moist salt is that moist salt sticks to the walls of the mill, making it difficult to grind the salt. Moreover, because moist salt sticks to the walls of the mill, this also leads to waste because simply shaking the mill is not enough to detach the salt from the walls of the mill. As a consequence, the mill has to be refilled regularly. Furthermore, moist salt can corrode components of the mill, leading to physical and chemical reactions that may be harmful to the consumer.

SUMMARY OF THE INVENTION

In accordance with the present invention, such disadvantages are overcome by providing a mill for grinding seasonings, particularly moist salt, and especially Guérande salt, which prevents the salt from sticking to the walls of the mill, thereby improving the grinding yield.

To this end, a mill for grinding seasonings is provided which is comprised of a body, a drive shaft articulated within the body, and a cap covering the body. The drive shaft has a device for breaking up the salt.

In accordance with the present invention, the body receives a screw which is operated by the drive shaft and a drive disk. A knob is positioned on the cap covering the body of the mill, and is used to drive the resulting assembly.

The invention is hereafter described in further detail, with reference to the following drawings.

DETAILED DESCRIPTION OF THE PREFERRED EMBODIMENT

Figure 1:
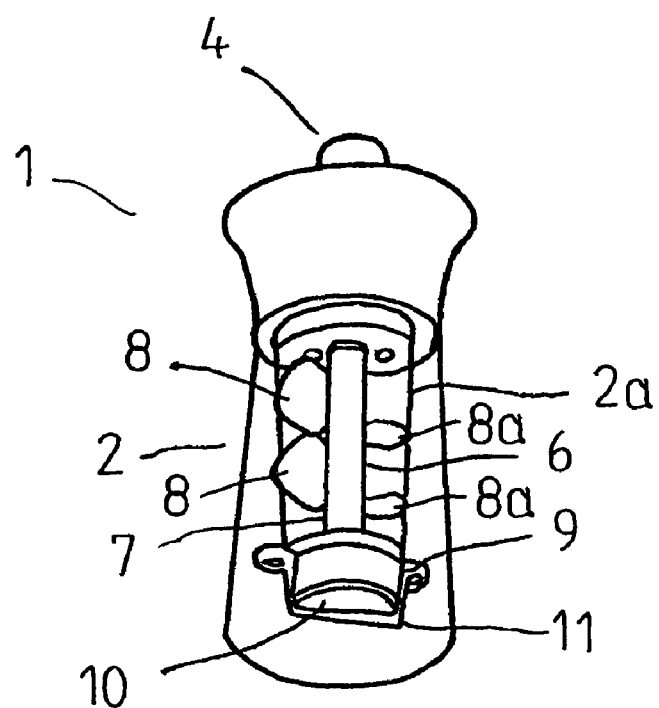
FIG. 1 is an isometric view of the mill of the present invention.
Figure 2:
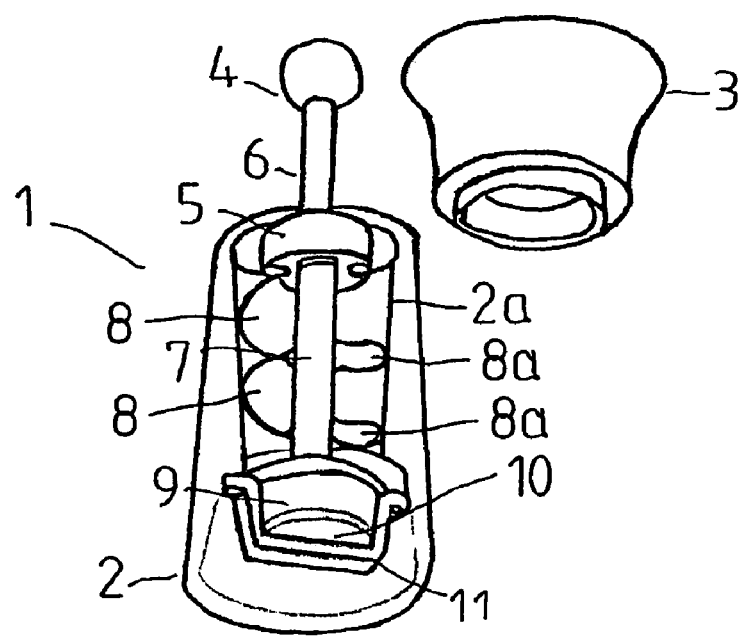
FIG. 2 is an isometric view of the mill shown in FIG. 1, with the cap removed.
Figure 3:
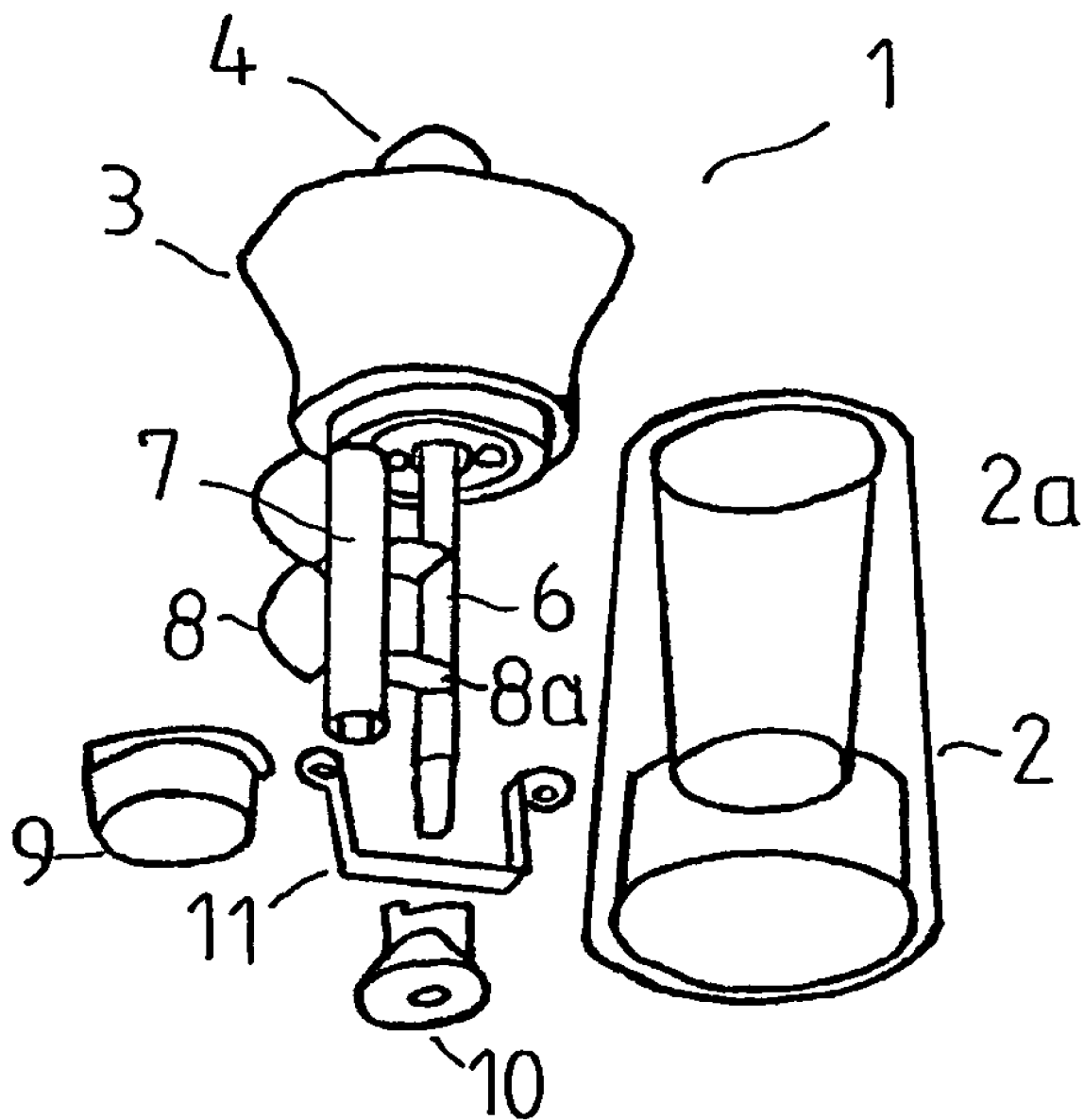
FIG. 3 is an exploded, isometric view of the mill shown in FIG. 1.

The mill 1 has a body 2 which is cylindrical in shape. A receptacle 2a is provided inside the body 2 for storing a seasoning, in particular, salt. The body 2 can be made of any of a variety of materials, such as wood or plastic.

The body 2 is enclosed by a cap 3 which is flared toward the top. A knob 4, in the form of a ball, is provided for mounting the cap 3 to the body 2. The cap 3 and the ball 4 can be made of any of a variety of materials, such as wood or plastic.

A drive disk 5 is situated at the connection between the cap 3 and the body 2 of the mill 1. The drive disk 5 is advantageously made of plastic to prevent any corrosion by the seasoning to be ground, in particular, a salt. The drive disk 5 is coupled with a shaft 6 for driving and adjusting the mill. The drive shaft 6 is also advantageously made of plastic, and receives the ball 4.

A screw 7 is attached to the bottom of the drive disk 5, passing through most of the body 2 of the mill 1, and covers the drive shaft 6. The screw 7 has several notches 8 including spaced projections 8a for breaking up the seasoning disposed along the drive shaft 6.

A bowl 9 is positioned at the bottom of the screw 7, which receives a bulb 10. The screw 7 bears on the bowl 9, where the seasoning is ground using the bulb 10. The bowl 9 and the bulb 10 will be made of ceramic to prevent any corrosion by the seasoning.

The drive shaft 6 of the mill 1 is advantageously overmolded by the bulb 10. The lower end of the bulb 10 is square in shape, as is the screw 7 which surrounds it, to prevent any twisting of the drive shaft 6. A bracket 11 surrounds the bottom of the bulb 10 and the bowl 9. The bracket 11 will be made of plastic.

The various components of the mill 1 are connected to one another by stainless steel screws. To prevent any corrosion, these screws are sealed off from the salt using a drop of resin that covers the heads of the screws. To this end, the housings for the screws are larger than the screws to allow a drop of resin to flow in, achieving the desired sealing function.

Grinding is adjusted using the knob 4 arranged on the cap 3. The user twists the cap 3, and the cap 3 drives the screw 7 via the disk 5. The screw 7 drives the shaft via the square shape located at the bottom of the screw 7.

The movement of the screw 7, together with the projections 8a of the notches 8, breaks up the seasoning and facilitates the grinding because the seasoning falls into the grinding device more readily. The seasoning falls into the bowl 9, where it is ground by the bulb 10.

Because the lower end of the drive shaft 6 is square, the drive shaft 6 is prevented from being twisted where it is driven by the screw 7. To prevent the plastic shaft 6 from being twisted by a drive which is applied at a point offset from the driving force, the driving force is relayed as close as possible to the bulb 10, via the screw 7.

Moreover, and because the bowl is made of a ceramic, the seasoning is ground finely, without corroding the components of the mill. This makes it possible to grind corrosive seasonings, such as salt, as well as to dispense such seasonings. Certain components of the mill of the present invention, such as the drive shaft, the drive disk and the screw, are made of plastic to prevent corrosion that would surely be caused to metal by a corrosive seasoning, such as salt.

While the invention has been described in relation to particular embodiments, it is to be understood that the present invention encompasses all technical equivalents of the means described.

The invention claimed is:

1. A mill for grinding a seasoning, comprising a body defining a receptacle for receiving the seasoning, a cap enclosing a first end of the receptacle of the body and a grinder enclosing a second end of the receptacle of the body opposite to the first end, a drive shaft articulated within and extending through the receptacle of the body, wherein the drive shaft is coupled with the grinder, wherein a screw for breaking up the seasoning is coupled with the drive shaft and received within the receptacle, and wherein the screw has a plurality of notches including projections for breaking up the seasoning.

2. The mill of claim 1 wherein the screw passes substantially fully through the receptacle of the body.

3. The mill of claim 1 wherein the screw is oriented within the receptacle of the body so that the seasoning broken up by the screw falls into the grinder.

4. The mill of claim 3 wherein the notches of the screw facilitate the seasoning to fall into the grinder.

5. The mill of claim 1 which further includes a drive disk coupled with the screw, wherein the drive disk is located at the first end of the receptacle of the body.

6. The mill of claim 5 wherein the drive disk, the drive shaft and the screw having the notches are made of a plastic.

7. The mill of claim 1 wherein the grinder includes a bowl surrounding a grinding bulb.

8. The mill of claim 7 wherein the bowl and the grinding bulb are made of a ceramic.

9. The mill of claim 1 wherein portions of the mill are assembled with stainless steel screws.

10. The mill of claim 9 wherein portions of the stainless steel screws are embedded in a resin.

11. The mill of claim 1 wherein an end of the drive shaft coupled with the grinder is squared.

12. The mill of claim 1 which further includes a plastic bracket overlying the grinder.

13. The mill of claim 1 wherein the projections of the screw are positioned at spaced locations along the screw.

14. The mill of claim 1 wherein the seasoning is moist salt.

15. The mill of claim 14 wherein the moist salt is Guérande salt.

* * * * *